United States Patent Office 3,383,335
Patented May 14, 1968

3,383,335
METHOD OF PRODUCING POLYMERS OF TRIOXANE AND SIMILAR OXA-COMPOUNDS
Miloslav Kucera, 32 Hoblikova; Jirina Lanikova, 58 Novackova; and Eduard Spousta, 100 Samalova, all of Brno, Czechoslovakia
No Drawing. Continuation-in-part of application Ser. No. 266,173, Mar. 19, 1963. This application June 21, 1967, Ser. No. 647,635
Claims priority, application Czechoslovakia, Mar. 23, 1962, 1,782/62
14 Claims. (Cl. 260—2)

ABSTRACT OF THE DISCLOSURE

Cyclic oxa-compounds such as epichlorohydrin, trioxane, dioxolane, tetrahyrofuran, oxacyclobutane, ethylene oxide, and cyclic derivatives thereof, are polymerized at temperatures up to about 150° C. in the presence of a catalytic quantity of an organo silicon compound of the formula:

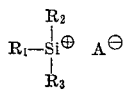

wherein $R_1$ may be hydrogen, alkyl or a siloxane chain of the general formula:

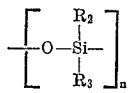

wherein $n$ is an integer between 0 and 100, each of $R_2$ and $R_3$ is $CH_3-$, $C_2H_5-$ or $CH_2=CH-$, and Ac is the anion of a strong acid. Some of the polymers have good emulsifying properties.

---

The present application is a continuation-in-part of our copending application Ser. No. 266,173, filed Mar. 19, 1963, and now abandoned and entitled, "Process for the Production of Polymers of Trioxane and Similar Cyclic Oxa-Compounds."

Background of the invention

The present invention relates to the production of polymers of trioxane and similar oxa-compounds such as dioxolane, tetrahydrofuran, oxacyclobutane, ethylene oxide and their derivatives by cationic polymerization.

In polymerization and copolymerization of substances of this type, use is made of $BF_3$ and its complexes with organic substances such as phenols, acids, ethers, esters, ketones or aldehydes and also other Lewis acids such as e.g. $BCl_3$, $ZnCl_2$, $CdCl_2$, $AlCl_3$, $AlBr_3$, $SnCl_4$, $SbCl_5$, $TiCl_4$, $FeCl_3$, $BiF_3$, $AiF_3$, $TiF_4$ etc.

As initiators these are used either alone or in combination with cocatalysts. In addition to these initiators the use of strong inorganic acids such as $H_2SO_4$, $HClO_4$ etc. is also known.

It is usually difficult to remove from the polymer residual catalyst of the type described above. Washing with water may result in partial hydrolysis of the catalyst yielding insoluble or sparingly soluble hydroxy compounds which remain in the polymer and substantially reduce its stability. The use of organic solvents for washing the polymer is expensive and does not permit of an economical production.

Also the measuring out of such catalyst for use presents difficulties. Such catalysts are usually poorly soluble in organic solvents; moreover, solvents suitable for the purposes of cationic polymerization are available only in a fairly restricted choice. Good solvents for said catalysts are found e.g. among halogenated hydrocarbons which, however, can be used in a few instances only in cationic polymerization owing to their high transfer ability. The transfer reaction of a growing polymer chain with a molecule of a halogenated solvent lowers the molecular weight of the polymer and results in the chemical incorporation of the halogen atom in the polymer. Halogen-containing polymers display a decreased stability as a function of time, which can be explained by the fact that they decompose into halogen acids which catalyze the decomposition of the polymer. The incorporation of a halogen atom into the polymer chain just described may also be the result of a reaction with the catalyst.

Summary of the invention

According to the present invention, the polymerization of at least one cyclic oxa-compound which may be and usually is, selected from the group consisting of epichlorohydrin, trioxane, dioxolane, tetrahydrofuran, oxacyclobutane, ethylene oxide, and cyclic derivatives thereof, is carried out by polymerizing the cyclic oxa-compound between 20–150° in the presence of a catalytic quantity of an organo silicon compound having the following formula:

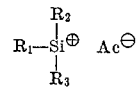

wherein $R_1$ is hydrogen, $CH_3-$, $C_2H_5-$ or a siloxane chain of the general formula

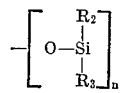

wherein $n$ is an integer between 0 and 100, each of $R_2$ and $R_3$ is $CH_3-$, $C_2H_5-$ or $CH_2=CH-$, and Ac is the anion of a strong acid.

Description of the preferred embodiments

According to the present invention, the polymerization is achieved by means of complexes of organo-silicon compounds with strong acids of the general formula

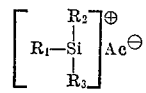

wherein $R_1$, is a hydrogen atom, $CH_3-$, $C_2H_5-$ or a siloxane chain of the general formula

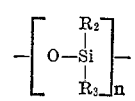

wherein $n$ has a value between 0 and 100; $R_2$ and $R_3$ are $CH_3-$, $C_2H_5-$ or $CH_2=CH-$ and Ac— is the anion of the used strong acid such as, e.g., $SO_4H^\ominus$, $ClO_4^\ominus$, etc.

$R_2$ and $R_3$, in theory, may be also aryls. Aryls substituted at the Si atom are not stable in acid medium and split off. The initiator so formed is quite efficient but possesses an increased number of active spots in the molecule and reacts in a kinetically complex manner.

By the use of said initiator in the polymerization of oxygen-containing heterocycles and their derivatives, the cation forming the organosilicon complex is incorporated as one end group of the polymer chain; this complex is stable and therefore cannot be the source of reactions rupturing the chain. The other end group of the polymer chain is formed by the anion of the acid if the polymerization was carried out in a pure system. This anion is comparatively easy to deactivate by washing with water.

The preparation of this initiator is very simple. It consists in the reaction of some of the usual polycyclosiloxanes with (practically) anhydrous acid at room temperature. The kind of the acid used determines the length of the siloxane chain $n$ and thereby also its solubility in organic solvents.

Hexaalkyldisiloxane can be added to polycyclosiloxane in order to influence the quality and the character of $R_1$ of the catalyst.

It is one of the advantages of this initiator that it contains practically no water, as all moisture (including any water of condensation) settles down and can very easily be removed from the initiator.

The following examples are given as illustrative only, without limiting the invention to the specific details thereof.

EXAMPLE I 35 g. of trioxane containing less than 30 p.p.m. of $H_2O$, less than 5 p.p.m. of HCOOH and less than 5 p.p.m. of $CH_3OH$, and in which no methylal was found by chromatographic means was polymerized at 85° C. using 0.1 millimoles of an organo-silicon complex of the type

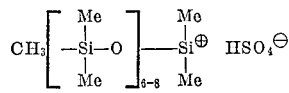

dissolved in 1 ml. of methylcyclohexane.

The initiator was prepared by reacting 98% $H_2SO_4$ with octamethylcyclohexasiloxane in the presence of hexamethyl-disiloxane (the weight ratios were 1:4:2) at room temperature with occasional stirring. The reaction lasted for 24 hours. After separating the water of condensation, the content of the effective substance—viz. the acid—was determined by acidimetric titration. The initiator was dissolved in methylcyclohexane to yield a solution of a concentration as indicated.

The polymerization was interrupted after 65 minutes when the conversion reached 30 percent. The polymer was washed with hot water and subsequently dried in air.

The polymer had the following properties and characteristics: Reduced viscosity 0.98 dl./g. (polymer concentration was 0.2 g./100 ml. of solvent which was a 3:1 mixture by weight of tetrachloroethane and phenol, the temperature of measurement was 90° C.). The stable portion (defined as that portion of the polymer which remains after refluxing the polymer with 0.1 percent alcoholic KOH for 3 hrs.) was 25 percent; the initial rate of decomposition at 222° C. was 1.02 percent per minute (determined by means of thermal balance operated in air).

EXAMPLE II 30 g. of trioxane containing less than 30 p.p.m. of $H_2O$, less than 5 p.p.m. of HCOOH, less than 5 p.p.m. of MeOH and less than 50 p.p.m. of methylal was copolymerized with 5 g. of dioxolane using 0.08 millimole of the catalyst as described in Example I at a temperature of 80° C. in a dilatometer which is provided with means for automatically recording the course of polymerization. Polymerization was interrupted after 2 hrs. at a conversion of 15 percent. The polymer was washed with hot water and dried in air. The polymer had the following characteristics (defined as in Example I): reduced viscosity–1.02 dl./g., stable portion—98 percent, initial rate of decomposition at 185° C.—0.1 percent per minute.

EXAMPLE III 50 g. of dioxalane was polymerized at 65° C. using 0.1 millimole of the organo-silicon complex which was obtained through bulk polymerization of 10 parts by weight of octamethyltetracyclosiloxane and 1 part by weight of sulfuric acid. The reaction took place as in Example I at room temperature with occasional stirring for 24 hours. After centrifugation, the upper phase containing the acid complex was separated and dissolved in methylcyclohexane. The solution of the initiator substance

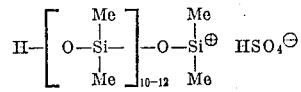

was analyzed for the content of the $Si^+HSO_4^-$ ion pairs and the necessary amount of the solution was measured out to initiate the polymerization. Polymerization was interrupted at a 30 percent conversion. After neutralizing the catalyst with alcoholic KOH, the polymer was precipitated from the ternary mixture $H_2O$-alcohol-cyclohexane. The polymer so obtained had a reduced viscosity of 0.25 dl./g. The polymer was soluble in water and has good emulsifying properties.

EXAMPLE IV 100 ml. of epichlorohydrin was polymerized with 0.3 millimoles of the organo-silicon complex described in Example 1. During polymerization which lasted 2½ hours the reaction mixture was cooled intensely to 35° C. After this time the catalyst was removed by repeated shaking with water. The polymer was freed from unreacted epichlorohydrin and water by evacuating it for 48 hours at a temperature of 40° C. The polymer, had a low molecular weight, and was a viscous liquid, stable at 120° C. and displaying interesting properties; it has a good gelatinizing action toward polyvinyl chloride from which it does not migrate even after a fortnight's standing at 48° C.

EXAMPLE V 0.4 millimoles of the catalyst described in Example 3 was dissolved in 50 ml. of methylcyclohexane contained in a closed vessel. 30 g. of ethylene oxide was introduced by bubbling gaseous ethylene oxide from a pressure vessel into this solution. Before entering the reaction vessel, which was maintained at 25° C., the ethylene oxide was dried using a 5 molecular sieve. The polymerization was interrupted by injecting 10 ml. of gaseous ammonia into the reactor. The polymer was isolated by evacuating the reaction mixture. 21 g. of polymer was obtained which was stable at higher temperatures and had a molecular weight of 5,000.

EXAMPLE VI

Preparation of the initiator: 1 part by weight of anhydrous $HClO_4$ was added to 10 parts by weight of tetramethyltetravinylcyclohexasiloxane. After 5 hours the reaction yielded a low-viscosity polymer. Excess acid was removed by sedimentation in a separatory funnel, the siloxane layer was dissolved in cyclohexane and after analysis for the content of $Si^+ClO_4^-$ the required amount (5 ml.) was added to the monomer. The initiator had the following composition:

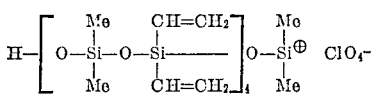

0.5 mole of this complex was added to 100 g. of carefully purified tetrahydrofuran containing about 100 p.p.m. of water, and the mixture was polymerized at 60° C. After ten hours the polymerization was interrupted by dissolving the reaction mixture in ether and intensely shaking the ethereal solution with 0.5 percent aqueous NaOH. The ethereal solution was washed with water and then ether, water and the unreacted tetrahydrofuran were removed from the solution by evacuating it at 100° C. 36 g. of polymer was obtained.

EXAMPLE VII 30 g. of trioxane of analytical data as in Example II was polymerized at 80° C. in a reactor in which an excess pressure (90 mm. Hg) of ethylene oxide was maintained. Polymerization was catalyzed by 0.08 millimoles of the organo-silicon complex as in Example I. The process was interrupted at a 10 percent conversion by pouring the reaction mixture into water having a temperature of 80° C. The polymer was washed with hot water until negative in reaction for formaldehyde and dried in an air oven at 60° C. to constant weight. The polymer had the following characteristics (defined as in Example 1): the reduced viscosity was 0.98 dl./g., stable portion was 96 percent, initial decomposition rate was 0.12 percent per minute at 222° C. In all foregoing examples an inert organic solvent e.g. cyclohexane can also be used as the medium in which the polymerization takes place and the obtained polymers have similar properties as those obtained by the process described in the examples.

EXAMPLE VIII

The initiator was prepared by a procedure exactly similar to that of Example III, except that octaethylcyclohexasiloxane was used instead of octamethylcyclohexasiloxane. The initiator so produced was more soluble in hydrocarbon solvents. Other properties, was well as the properties of the polymer produced by its action, were the same as in Example III.

EXAMPLE IX

Preparation of the initiator: 1 part by weight of anhydrous HClO₄ was added to 50 parts by weight of octamethylcyclotetrasiloxane. After 24 hours of reaction at room temperature the unreacted acid was separated from the upper viscous layer of the polymer containing the Si⁺ClO₄⁻ complex; the polymer was dissolved in cyclohexane. The active part of the initiator, viz.

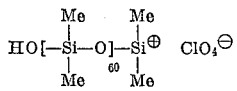

was used to initiate the polymerization of tetrahydrofuran. 0.5 mole of Si⁺ClO₄⁻ was used to initiate the polymerization of 30 moles of tetrahydrofuran at 0° C. The polymer formed had the character of a block copolymer made up of siloxane and tetrahydrofuran sections and was noted for its hydrophobous qualities.

EXAMPLE X

Initiator prepared as in Example VI except that decamethylcyclopentasiloxane was used instead of tetramethyltetravinylcyclotetrasiloxane, to polymerize 3,3 bischloromethyloxacyclobutane. 0.1 mole/kg. of complex Si⁺ClO₄⁻ initiated at 0° C. the polymerization of 75 volume parts of 3,3 bischloromethyloxacyclobutane in 25 volume parts of heptene. After five hours of polymerization the reaction was stopped by introducing 0.5 mole/kg. of ammonia into the reaction medium; the polymer was separated and washed. After washing twice in boiling water the polymer did not contain any detectable traces of acids.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:
1. A process for the polymerization of at least one cyclic oxa-compound selected from the group consisting of epichlorohydrin, trioxane, dioxolane, tetrahydrofuran, oxacyclobutane, ethylene oxide, and cyclic derivatives thereof, which comprises polymerizing said cyclic oxa-compound between 20–150° C. in the presence of a catalytic quantity of an organo silicon compound having the following formula:

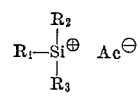

wherein $R_1$ is hydrogen, $CH_3-$, $C_2H_5-$ or a siloxane chain of the general formula:

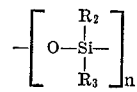

wherein $n$ is an integer between 0 and 100, each of $R_2$ and $R_3$ is $CH_3-$, $C_2H_5-$ or $CH_2=CH-$ and $Ac^\ominus$ is the anion of a strong acid.

2. Process according to claim 1, wherein said organo-silicon compound is used in an amount of from 0.1 to 500 millimoles per mole of said cyclic compound.

3. Process according to claim 1, which comprises effecting said reaction in the presence of a solvent.

4. Process according to claim 1, which comprises effecting said reaction in the absence of a solvent.

5. Process according to claim 1, wherein said acid anion is $SO_4H^\ominus$.

6. Process according to claim 1, wherein said acid anion is $ClO_4^\ominus$.

7. Process according to claim 1, wherein said cyclic compound is selected from the group consisting of trioxane and dioxolane and said organo-silicon compound is

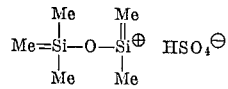

8. Process according to claim 1, wherein said cyclic compounds are selected from the group consisting of trioxane, dioxolane and 3,3 - bischloromethyloxacyclobutane, and said organo-silicon compound is

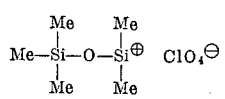

9. Process according to claim 1, wherein said cyclic compound is selected from the group consisting of dioxolane and 3,3-bischloromethyloxacyclobutane, and said organo-silicon compound is

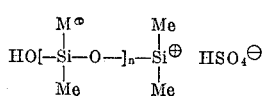

wherein $n$ is an integer between 1 and 100, both inclusive, Me is methyl, and which has been obtained by bulk polymerization of octamethylcyclotetrasiloxane with $H_2SO_4$.

10. Process according to claim 1, wherein said cyclic compound is epichlorohydrin and said organo-silicon compound is

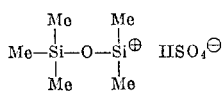

11. Process according to claim 1, wherein said cyclic compound is ethylene oxide and said organo-silicon compound is

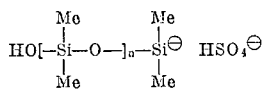

wherein $n$ is an integer between 1 and 100, both inclusive, Me is methyl, and which has been obtained by bulk polymerization of octamethylcyclotetrasiloxane with $H_2SO_4$.

12. Process according to claim 1, wherein said cyclic compound is tetrahydrofuran and said organo-silicon compound is

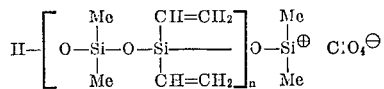

wherein $n$ is an integer between 1 and 100, both inclusive.

13. Process according to claim 1, wherein said cyclic compounds are selected from the group consisting of trioxane, ethylene oxide, and/or dioxolane.

14. The product obtained by the process of claim 1.

References Cited

UNITED STATES PATENTS 2,843,560 7/1958 Mika _____ 260—448.2
3,297,645 1/1967 Miller.

WILLIAM H. SHORT, *Primary Examiner.*

T. PERTILLA, *Assistant Examiner.*